United States Patent

Bidault et al.

[15] 3,699,647

[45] Oct. 24, 1972

[54] METHOD OF MANUFACTURING LONG LENGTH COMPOSITE SUPERCONDUCTORS

[72] Inventors: Michel Bidault, Bougival; Jean Dosdat, Verrieres le Buisson; Roland Lelay, Morsang sur Orge; Jean Claude Parouty, Houilles, all of France

[73] Assignee: Compagnie Francaise Thomson Houston-Hotchkiss Brandt, Paris, France

[22] Filed: July 15, 1970

[21] Appl. No.: 55,095

[30] Foreign Application Priority Data

July 18, 1969 France....................6924592

[52] U.S. Cl...............29/599, 29/200 B, 29/DIG. 11, 72/286, 72/700, 174/DIG. 6, 228/5

[51] Int. Cl...............................................H01v 11/00

[58] Field of Search.............29/599, 200 B, DIG. 11; 174/126 CP, DIG. 6; 335/216; 228/4, 5; 72/274, 286, 700

[56] References Cited

UNITED STATES PATENTS

| | | | |
|---|---|---|---|
| 3,218,693 | 11/1965 | Allen et al. | 29/599 |
| 3,577,151 | 5/1971 | Bogner | 174/128 |
| 3,550,050 | 12/1970 | Albrecht | 335/216 X |
| 3,470,508 | 9/1969 | Donadieu et al. | 335/216 |
| 3,505,719 | 4/1970 | O'Malley et al. | 29/200 B |

*Primary Examiner*—John F. Campbell
*Assistant Examiner*—Donald C. Reiley, III
*Attorney*—Flynn and Frishauf

[57] ABSTRACT

Elongated elements of superconductive material are applied to an elongated, heated base support at a temperature permitting retention of the superconductive qualities in the material, and in a controlled atmosphere, the application step being carried out while twisting the superconductive element with respect to the base support so that the major axes of the superconductive elements will be inclined with respect to the major axis of the base support; composite elements can be made by applying composites of the resulting superconductive material and elongated base supports on additional supports, or forming them in tubular or other form, joined together, at temperatures below the temperatures at which the superconductive properties of the superconductive elements are affected.

18 Claims, 17 Drawing Figures

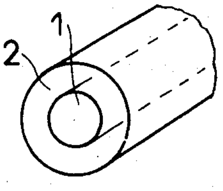
Fig 1
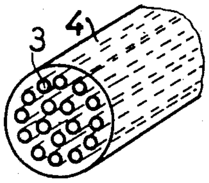
Fig 2
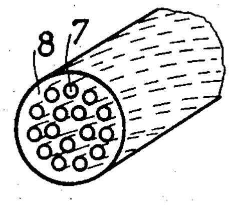
Fig 4
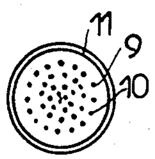
Fig 5
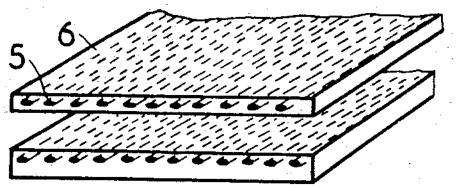
Fig 3
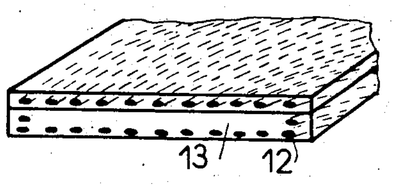
Fig 6
Fig 7
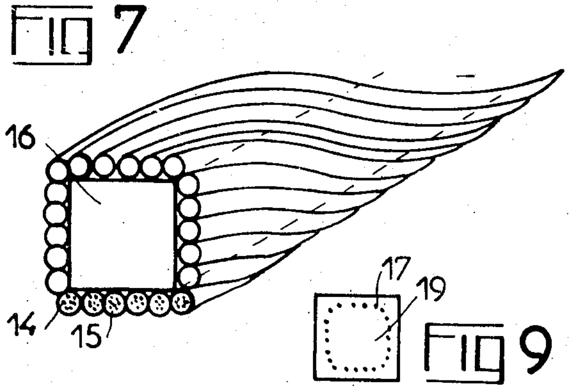
Fig 7, Fig 9
Fig 8
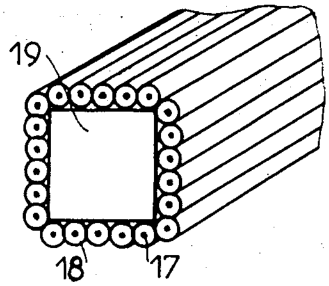
Fig 10
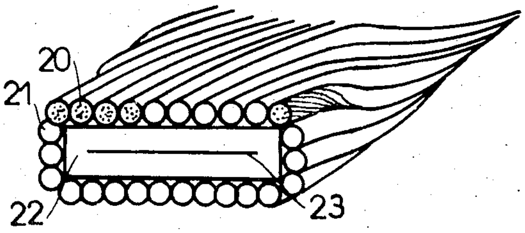
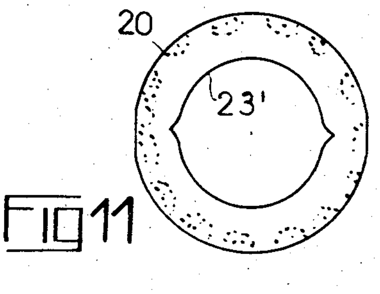
Fig 11

METHOD OF MANUFACTURING LONG LENGTH COMPOSITE SUPERCONDUCTORS

The present invention relates to methods of making long length composite superconductors, and more particularly to superconductors in which a superconductive element, or filament is incorporated in a stabilizing material. The stabilizing material itself may be hollow to provide a duct for cryogenic fluid. The invention is equally applicable to the manufacture of the solid superconductors, and the products obtained by the methods.

Superconductors usually are formed as a matrix of good heat-conductive and electricity-conductive material, such as copper, in which superconductor elements or superconductor filaments are embedded. These superconductor filaments may have their longitudinal axes parallel to the main longitudinal axis of the composite superconductor element, or may be transposed with respect thereto. It is known to provide solid superconductors which are composites, and in which the superconductive elements are parallel among each other. Methods to manufacture such superconductors utilize, for example, extrusion presses, ingot lamination equipment, in which copper or aluminum ingots have superconductive elongated elements such as wires or bars embedded therein; according to another known method, a tape, or ribbon formed with one or several grooves has superconductive elements mounted and inserted in the grooves; or wire-shaped superconductors are fused with an encircling band or ribbon rolled therearound by means of a metal having a low fusion point; alternatively, the superconductive elements may be hot-plated to stabilizing tapes, ribbons, for subsequent incorporation therein.

It is also known to provide composite hollow superconductors by extrusion with a floating needle to provide a composite superconductor having a superconductive element, in tubular form, previously located in parallel with the interior of a tube, or between a pair of concentric tubes, both of which are of good heat and electricity conductive material.

Superconductive materials themselves for use in these processes are well known; they are, primarily, alloys of NbTi, NbZr, NbTiZr, or composites of $Nb_3Sn$, $V_3Ga$, $V_3Si$; stabilizing materials are, for example, Cu, Al, Ag, Be, Pb, Sn, In.

The various known processes of the prior art have the disadvantage that the superconductive elements are, after manufacture, parallel among each other so that the composite superconductor will be subject to stray currents having a slow decay time which disturbs proper functioning of coils made with the superconductors; the whole, unitary length of the superconductors is comparatively short, in the case of extrusion for example 300 meters. This limit is difficult to exceed with ordinary tools; and difficulties arise in the connection between the superconductor elements and the stabilizing jacket, which is often not an intimate contact, particularly when metals having a low melting point are used.

The superconductive elements previously made have a form which is conducive to substantial anisotropic characteristics, particularly when the superconductors are in ribbon form; they have a substantial diameter, for example in the range of from 0.25 to 1 mm diameter for the wires, which increases the difficulty of the stabilization, and does not ensure the extent of stabilization which can be obtained, for example, with fine filaments in the order of 2 to 200 $\mu$ in diameter.

If the manufacturing process is by way of extrusion, special pre-conditioning of the materials to be used is necessary which is both costly and difficult to carry out. During manufacture, the superconductor may be heated to temperatures which are incompatible with retention of best superconductive properties itself, particularly when extrusion processes are used.

It has been proposed to manufacture superconductive coils by utilizing hollow conductors in which helium is circulated as a cooling medium. The advantages of such techniques are the simplicity of manufacture of the cryostat, the possibility of exterior insulation and increased and improved stabilization by the improved cooling.

It is accordingly an object of the present invention to provide a process for the manufacture of superconductors, either hollow or solid, in which the difficulties previously experienced are avoided, or at least decreased, and more particularly to make superconductors, hollow or solid, of substantial length, which can easily be stabilized thermally and electrically and which have a good metallurgical interconnection between the various elements of the composite superconductor; and in which the superconductor materials themselves can be provided as fine wires, or the like, dispersed, preferably uniformly, in a stabilizing body, and which can be made to be either parallel, or inclined with respect to the major axis of the composite superconductor.

As used in the present specification, the term "transposition" of superconductive material is intended to mean that fine superconductive filaments which are already embedded in a stabilizing element are spirally located within the stabilizing element; alternatively, a composite superconductor in which the filaments are either already transposed, or are parallel to the major axis of the superconductor may be combined with a number of other superconductors, to be made into a multi-strand, multi-filament superconductor, again further applied on a stabilizing material or, forming directly the stabilizing material itself; as a result, the axes of the individual superconductor wires will therefore be inclined with respect to the major axis of the final composite product, that is they will be transposed with respect to the final resulting composite, or double composite superconductor.

Composite superconductors utilized in the present invention are described, example, in French Pat. No. 1,460,032; French addition 90,029 and addition 166,890; as well as in French Pat. No. 1,584,811. In accordance with the teachings disclosed in the aforementioned patents, superconductor elements which may be either transposed, or parallel to the major axis of the eventual product are applied by hot-plating of the semiconductor substance on a stabilizing material which may be in rod, or stem-like form, a bar, plate, tape, or tube. In general, the plating temperature is between 200° and 800° C, and preferably between 400° and 600° C. The plating process itself is carried out by mechanical application, such as laminating superconductor material to the stabilizing base, by stretching, wire drawing, hammering, swaging, or the like. The reduction of the sections per passage through a manufacturing process, for example by drawing, may be between zero and 80 % and, depending on the temperature at which the process is carried out, a neutral or protective atmosphere may be provided, such as a mixture of 10% hydrogen and nitrogen. During the processes, reinforcing elements such as stainless steel or a copper alloy such as CuBe may be inserted or added at selected positions in the composite superconductor to improve the mechanical properties of the eventual composite conductor which is obtained.

In filamentary superconductors, and particularly in multifilamentary superconductors, the individual elementary superconductive filaments are preferably very fine, that is have a diameter of from 2 to 200 μ. This increases the stability of the eventual final composite product. Hollow conductors in which the interior and exterior is of round, square or rectangular cross-section, or other cross-section such as, for example hexagonal, may be made by utilizing a central mandrel, a floating needle, or a drawing cone to make the hole of the eventual resulting tube.

The invention also permits applying fine multifilamentary elements forming adjacent composites of Nb + Sn.

SUBJECT MATTER OF THE PRESENT INVENTION

Briefly, composite superconductors capable of being made in long lengths and having substantial thermal and electrical stability are made by transposing elongated elements of superconductive base material, during the application step, on a heated, elongated base support, the transposing and application step being carried out at temperatures permitting retention of superconductive qualities in the material, and in a controlled atmosphere, the application step providing for transposition, that is being carried out so that the major axes of the superconductive elements will be inclined with respect to the major axis of the base support. Preferably, the heated base supports already are composite superconductors in which superconductor wires are embedded in a stabilizer.

Fine multi-filamentary superconductors forming adjacent composites of Nb + Sn may be made by first placing a jacket of, for example, stainless steel, or nickel, around fine adjacent wires of Nb and Sn. This operation may be carried out several times, the composite obtained in one path being associated with that during the next one. The entire composite, thus made, and with the wires either axially aligned or spiralled, that is, transposed, then forms a superconductor element which is applied hot, with transposition, on a rod or a tube as above described. After such application, the composite product is annealed. The time and temperature may vary between wide limits, for example from ten minutes to 5 hours, and at ranges between 600° and 1,200° C, preferably between 800° and 1,000° C, so that a composite $Nb_3Sn$ as fine filaments from 2 to 50 μ diameter will result, embedded in a matrix of tin and steel.

A similar process may be used by replacing the tin with an alloy of aluminum and germanium (AlGe), so that the final product will be filaments of $Nb_3$(AlGe).

The invention will be described by way of example with reference to the accompanying drawings, wherein:

FIGS. 1 and 2 are schematic cross-sectional views of non-transposed superconductors used in the present invention;

FIG. 3 is a flat non-transposed superconductor in transverse schematic view;

FIGS. 4 and 5 are schematic illustrations of transposed superconductors;

FIG. 6 is a schematic transverse view of a flat transposed superconductor;

FIGS. 7 and 8 illustrate applications of superconductors to form a hollow composite with square cross-section;

FIG. 9 illustrates another arrangement of the superconductor;

FIG. 10 illustrates an arrangement of a composite super-conductor on a stabilizing bar with rectangular cross section;

FIGS. 11 and 12 are schematic representations showing steps in processes in accordance with the present invention;

Figure 17:
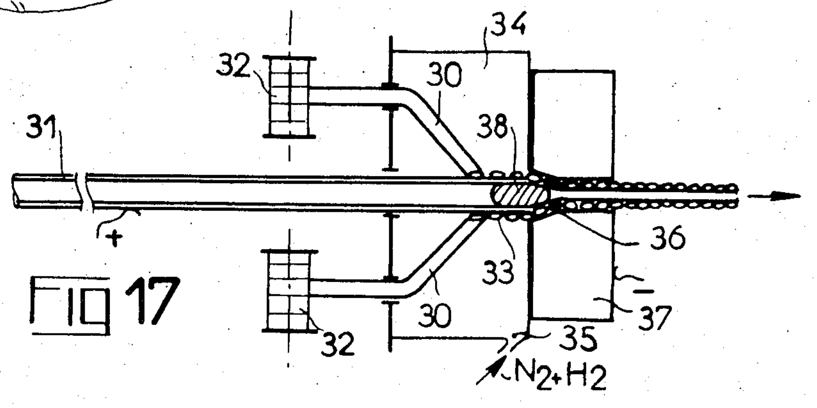

and FIG. 17 is a schematic showing of an apparatus to carry out the process of the present invention.

FIGS. 1 to 3 show a transverse section of composite superconductors made, for example, in accordance with the methods in the above-mentioned French patents, and which are to be transposed upon application to a composite element. In FIG. 1, a round monofilament 1 of NbTi is encased in a copper stabilizer 2. FIG. 2 illustrates non-transposed multifilaments, for example of NbTi encased in a copper stabilizer 4. FIG. 3 illustrates multifilaments of NbTi in a ribbon-form copper stabilizer 6, which are also not transposed.

FIG. 4 is similar to FIG. 2, except that multi-filaments 7 are transposed in a copper stabilizer 8 which, in turn, will form a base for further transposition. FIG. 6 illustrates filaments 9 of Nb, and filaments 10 of Sn which are transposed and located within a jacket 11 of, for example, stainless steel, and which may also serve as base material for application, and transposition, around a further stabilizer. FIG. 6 illustrates, schematically, ribbons 12 of NbTi transposed within a jacket of stabilizer 13 which may, again, be copper, aluminum or the like.

In accordance with the process of the present invention, a superconductor such as, for example, illustrated in FIGS. 2 or 4 is made, for example by successive drawings of superconductive material and jacketing material, as explained in the aforementioned French patents. The composite multifilament will have a diameter of, for example, 1.65 mm and may include 133 superconductive filaments of 100 μ diameter each. The jacket, or matrix is a high-purity copper. Transposition is usually carried out in the course of the last drawing passage by rotating the product upstream of the drawing die. The pitch length of the transposition, that is the twist of the spiral may be, for example 40 cm per revolution.

The apparatus of FIG. 17 may be used to apply a composite of 44 multifilaments 30 (of which only a few are shown), each of a diameter of 1.65 mm on a copper tube 31, inside/outside of dimension of 1.4/2 cm and 800 meters in length, which has been cleaned and brushed, and is heated to a temperature between 400° and 800° C. Heating can be obtained by electricity, by high frequency, or by a resistance furnace not shown. Electrical connections to the tube are schematically indicated in FIG. 17. The multifilaments 30, which are not heated, and thus are at ambient temperature, are supplied from spools 32 and are twisted about the hot tube 31 at 33 for three or four revolutions, just before being drawn through a drawing tube. The hot portion of tube 31 is passed through a housing 34, close to the drawing end, into which a reducing atmosphere is applied through opening 35. The reducing gas may be, for example, 90 percent $N_2$, and 10 percent $H_2$. The 44 spools 32, supplying the multifilaments 30 rotate about tube 31 in a well-known manner; as the composite is drawn out, the final desired pitch will be obtained, for example, 1 meter per revolution.

At the start of the process, the end pieces of the multifilaments are preliminarily secured to tube 31, for example by brazing, soldering or the like in order to permit drawing out of a composite formed of the tube and the surrounding, spiralled composite superconductors 30 from the drawing point, or die 37. A drawing core, or cone 38, and covered with a high temperature lubricant, such as molybdenum bisulfide is placed at the interior of the tube. The lubricant should be capable of operation at temperatures from 400° to 800° C.

A drawing speed of about 3 meters per minute can be obtained, with a reduction in diameter of from 35 to 40 percent. The dimensions of the resulting tubular product will be round, approximately 12 mm interior diameter, and 19 mm exterior diameter. The 5,852 superconductor filaments will, each, have a diameter of approximately 80 $\mu$, and the transposition pitch will be approximately one meter. The critical current of such a composite superconductor will be 25,000 A, at 5 Tessla.

The composite, hollow superconductor may be shaped in square or rectangular form; additional drawing passes can be added, by cold drawing with a mandrel, or core to further reduce the cross-section.

Figure 15:
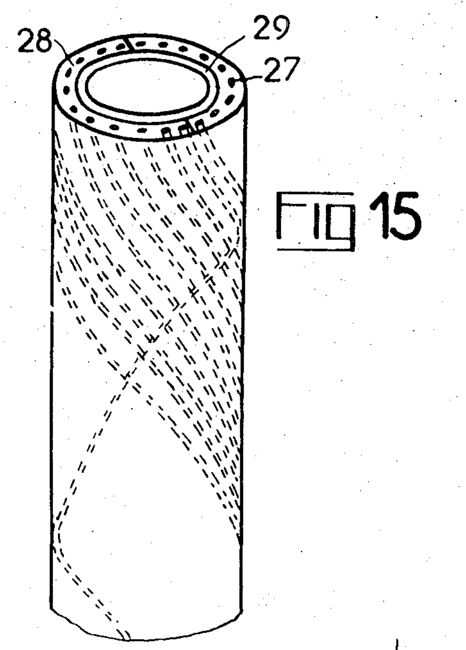
FIGS. 15 and 16 are a perspective, and an end view of composite superconductors using ribbon-type elements.
Figure 16:
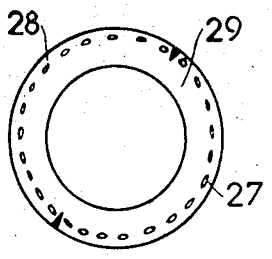

In accordance with another embodiment of the present invention, two flat ribbons such as those shown, for example, in FIGS. 3 or 6, are utilized as the starting product. The method of applying the ribbons on a tube is similar, however somewhat simplified due to the flat shape. Particularly when only two ribbons are used, they can readily be placed next to each other, while being spiralled around the tube, as illustrated in FIG. 15, with the cross-sectional, final product obtained being illustrated in FIG. 16. The two ribbons 27, 28, (FIG. 15) are applied, with twist, on round tube 29.

FIGS. 7, 8, 10 and 13 illustrate the application of composite strands of superconductive elements on a carrier tube; in FIG. 7 multi-filamentary composite strands 14, not transposed, and embedded in a stabilizer 15 are placed, with a subsequent transposition, on a square cross-sectional bar 16. FIG. 8 illustrates parallel placement of mono-filamentary superconductors 17, similar to those shown in FIG. 1, and located in a stabilizer 18 on a square cross-sectional bar 19. The composite is shown in not transposed in FIG. 8, for contrast with FIG. 7. FIG. 10 illustrates multifilaments 20, each individually transposed and embedded in a stabilizing jacket 21, and applied on a flattened tube 22. The internal wall of the tube is covered with a substance preventing fusion of the internal surfaces when the multifilamentary strands are applied, with heat. Such a substance may, for example, be an ink which, after flattening, leaves a line visible at 23. The individual composite superconductor strands 20, 21 may be of the form shown in FIG. 4.

Figure 12:
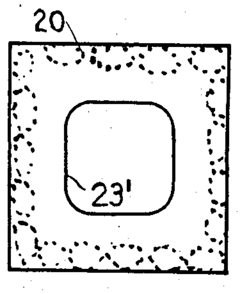

The solid bars 16, 19 (FIGS. 7 and 8), after application of the composite superconductors thereto and drawing through a drawing apparatus so that the final cross-section will be similar to that shown in FIG. 9, can be made hollow by drawing the composite over a core, as well known in tube manufacturing art. The final result will then be similar to that shown in FIG. 12. The various individual filaments of superconductive material 20 will be completely embedded in the walls of a tube which may, for example, have square cross section (FIG. 12) or circular cross-section (FIG. 11). The internal walls 23' will correspond to the walls seen as the ink line 23 in FIG. 10.

Figures 13, 14:
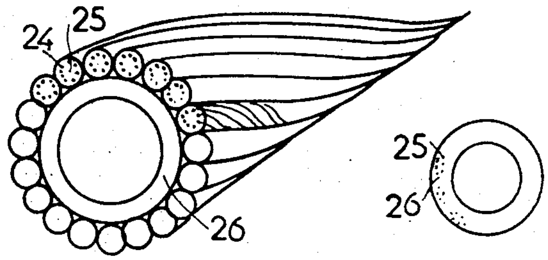
FIGS. 13 and 14 are transverse schematic views illustrating transposed superconductors with round cross-section.

FIG. 13 illustrates application of composite superconductor elements similar to those of FIG. 2, that is elements which are already transposed on a round tube 26. The superconductors 24 are each embedded in a stabilizer 25. After application of the superconductors to the tube 26, and drawing the composite through a drawing die, a cross-sectional cut will be similar to that illustrated in FIG. 14. The final product obtained from the apparatus of FIG. 17 will have, in cross-section, the appearance similar to FIG. 11, 12 or 14, depending on the final shape of the last drawing die and core. The internal diameter of the final product need not be less than that of the starting tube 31 but, rather, can be distended which will result in placement of the superconductive elements close to the outer surface, as seen, for example, in FIGS. 11 and 12. Distention is carried out while drawing the final product, under pressure, and with a suitable core.

In accordance with a different embodiment of the present invention, several ribbons of $Nb_3Sn$ and manufactured in a known manner, for example by diffusion, are electrolytically covered with copper and plated on copper wires, for example of from 6 to 10 mm width, and of a thickness of 150 $\mu$. These ribbons are rolled about a tube with a pitch of, for example, 60 mm with slight intervals between each ribbon. Final application and merging of the ribbon unto the tube is carried out at a temperature of about 300° C by means of a tin-lead solder for example, which intimately connects the tube and the $Nb_3Sn$ ribbon. The $Nb_3Sn$ ribbons may be replaced by multifilamentary composites of Nb + Sn and steel. The entire composite of the wires, rolled about a tube, is applied under heat, as previously described. The final product can then be annealed at a temperature of 950° C, for about four hours, in order to form the $Nb_3Sn$.

The products made by the method as previously described have various advantages: Large unitary lengths can be obtained, without intermediate joints, in the order of several kilometers; the variety of the shape of the products of the final composition obtained, as well as the electrical characteristics is great, so that the process is versatile and the designer of the equipment in which the superconductors made in accordance with the present invention are to be used has wide latitude in formulating specifications; the individual superconductor filaments will be of essentially isotropic fiber orientation; due to the small diameter of the individual superconductor filaments, the stability of the resulting product is excellent; and, due to the capability of drawing the final product with transposition, parasitic currents are largely suppressed.

The flattened tube of FIG. 10, for example, which is easy to store and ship can be used as a base for the final composite superconductor by expanding the collapsed tube after application of the superconductors thereon, so that the spiralled superconductors will embed themselves in the material of the tube. The interior ink, visible at 23, and which prevents fusion of the collapsed side walls assists in reestablishing the tubular form. The superconductor filaments will then, therefore, be distributed throughout a matrix of good heat-conductive and electricity-conductive material. The core 38 (FIG. 17) can be shaped to effect the distention. If desired, additional material which is good heat-conductive and electricity-conductive can be added at the point of drawing the collapsed, or other tube, or a solid bar through die 36 so that the superconductor filaments will be well distributed in a matrix of stabilizing material. If the base support is tubular, even if previously collapsed, it can be distended by core 38, embedding pressure being generated by placing the core at least partly within the outline of the drawing die 36.

We claim:

1. Method of manufacturing composite superconductors capable of being made in long lengths and having substantial thermal and electrical stability comprising applying elongated composite superconductor wires having superconductive filaments embedded in a support, unto the surface of an elongated base support, said application step comprising heating the base support to a temperature permitting retention of superconductive qualities in the superconductor filaments and being within about 400°C to 800°C, spirally applying said superconductor elements while at ambient room temperature to said heated base support with their major axes inclined with respect to the major axis of said base support; and merging said ambient temperature superconductor wires with the heated base support by mechanical conjoint extrusion while in a controlled atmosphere.

2. Method according to claim 1, wherein the elongated heated base support comprises a rod, a bar, a band, or tube.

3. Method according to claim 1, wherein the superconductors comprise a plurality of superconductive filaments embedded in a stabilizing material, the outline of said stabilizing material with said embedded filaments being substantially round.

4. Method according to claim 1, wherein the superconductors comprise a mono-filamentary superconductive filament embedded in a stabilizing cover.

5. Method according to claim 1, wherein the superconductor comprises multifilamentary superconductive filaments embedded in a ribbon of stabilizing material.

6. Method according to claim 1, wherein the superconductors comprise a superconductor filament having a major axis extending essentially parallel to the axis of the stabilizer.

7. Method according to claim 1, wherein the superconductor comprises superconductive filaments having their major axes extending at an inclination with respect to the axis of the stabilizer, whereby the superconductive filaments will be transposed.

8. Method according to claim 1, wherein the superconductive filaments have an individual filamentary thickness of 200 $\mu$ or less.

9. Method according to claim 1 wherein the controlled atmosphere is a reducing atmosphere.

10. Apparatus to make composite superconductors having an elongated base support and composite superconductor wires with superconductive filaments therein applied to the base, comprising a heating means to heat said base support; supply means applying said superconductor wires with said superconductive filaments therein about said base support to spirally apply said superconductor wires about the heated base support;

a housing, and means providing a protective atmosphere within said housing;

a drawing die located in said housing and receiving said heated base support with said superconductor wires spirally applied to the surface thereof, said drawing die merging together said superconductor wires to the surface of said heated base support while in the protective atmosphere.

11. Method according to claim 1, wherein said superconductors comprise fine wires of niobium and tin, or of niobium and an aluminum-germanium alloy, closely adjacently located within a metallic jacket;

and the step of application of said superconductor elements to said base support is followed by a heating step at a temperature in which the niobium and tin, or niobium and aluminum-germanium alloy transforms into $Nb_3Sn$, or $Nb_3$ (AlGe), respectively.

12. Method according to claim 1, wherein said base support comprises a flattened tube;

and said method includes the additional step of expanding said tube after application of said superconductors thereon, under pressure, to embed said superconductors, with said superconductive filament therein, in the material of said tube.

13. Method according to claim 1, including the step of inserting, after application of said superconductors to said base support, the composite of superconductors and base support, under pressure, in a matrix of good heat-conductive and electricity-conductive material and distention, under pressure, to form a hollow composite superconductor.

14. Method according to claim 13, wherein the superconductors are applied to said base support under heat, said base support comprising a flattened tube (FIG. 10);

and said flattened tube is inserted into a matrix of material of good electrical and heat conductivity and distended, under pressure, to form a hollow composite superconductor.

15. Method according to claim 1, including the step of preliminarily securing said superconductors to said base support in advance of said application step.

16. Method according to claim 15, wherein said securing step includes the step of brazing the terminal ends of the superconductors to the base support.

17. Method according to claim 1, wherein the step of applying said superconductors to said elongated heated base support includes the step of spiralling said superconductors about said elongated, heated base support;

and drawing together, through a die, said superconductors, with said superconductive filaments therein, and said elongated base support.

18. Method according to claim 17, wherein the drawing step includes the step of drawing said superconductors with said superconductive filaments therein, and said base support, over a drawing core;

and reducing the diameter of the composite.

* * * * *